(12) United States Patent
Gerstel et al.

(10) Patent No.: US 7,983,558 B1
(45) Date of Patent: Jul. 19, 2011

(54) OPTICAL CONTROL PLANE DETERMINATION OF LIGHTPATHS IN A DWDM NETWORK

(75) Inventors: Ornan Gerstel, Los Altos, CA (US); Gabriele Maria Galimberti, Lombardia (IT); Jean-Philippe Vasseur, Dunstable, MA (US); Giovanni Martinelli, Lombardia (IT)

(73) Assignee: Cisco Technology, Inc., San Jose, CA (US)

( * ) Notice: Subject to any disclaimer, the term of this patent is extended or adjusted under 35 U.S.C. 154(b) by 631 days.

(21) Appl. No.: 11/695,281

(22) Filed: Apr. 2, 2007

(51) Int. Cl.
*H04B 10/08* (2006.01)

(52) U.S. Cl. ................. 398/25; 398/33; 398/90

(58) Field of Classification Search ............ 398/48–57, 398/70–74, 93, 25, 33–34, 90
See application file for complete search history.

(56) References Cited

U.S. PATENT DOCUMENTS

| | | | |
|---|---|---|---|
| 7,457,277 B1 * | 11/2008 | Sharma et al. | 370/351 |
| 2002/0131103 A1 * | 9/2002 | Bambos | 359/118 |
| 2003/0163555 A1 * | 8/2003 | Battou et al. | 709/223 |
| 2005/0089027 A1 * | 4/2005 | Colton | 370/380 |
| 2007/0121507 A1 * | 5/2007 | Manzalini et al. | 370/235 |

* cited by examiner

*Primary Examiner* — Dzung D Tran

(57) ABSTRACT

An optical control plane (OCP) distinct from an electronic control plane helps the setup of path routes in a DWDM network. The OCP determines the optical feasibility of any path route selected by the electronic control plane, such as operated under GMPLS protocol, and asks the electronic control plane for another path route if the optical feasibility is determined to be negative. The OCP can be set in a server or distributed across the nodes of the network.

34 Claims, 11 Drawing Sheets

OPTICAL CONTROL PLANE DETERMINATION OF LIGHTPATHS IN A DWDM NETWORK

BACKGROUND OF THE INVENTION

The present invention is related to techniques of determining a path in DWDM networks.

DWDM (Dense WDM) networks are optical networks in which optical signals at different wavelengths share an optical fiber. Each wavelength defines a particular communication channel. In a stricter sense, DWDM also refers to an ITU (International Telecommunications Union) standard which includes the specification of the particular channel wavelengths and the spacings between these channels and is based upon WDM (Wavelength Division Multiplexing), an earlier ITU standard in which the channel spacings were further apart and a smaller number of wavelength channels were carried by an optical fiber. It should be noted that the term DWDM, as used herein, refers to the first, more inclusive sense so as to include the ITU WDM and DWDM standards, unless specifically stated otherwise.

For communication to be established between the source of the communication and its destination in a network, a path must be selected through the network nodes. The network path is determined by the control plane of the network. At each network node there is a control unit which, linked to other control units at other nodes of the network, selects the path of a communication from the node. The aggregate of the control units form the control plane of the network which, after determining the path, sets up the path of a communication from its source to its destination through the network nodes. Common technologies for such path determination are, e.g., IP (Internet Protocol), Frame Relay, ATM (Asynchronous Transfer Mode) and Ethernet, and a technology which fits over such older technologies is MPLS (MultiProtocol Label Switching) and its latest version GMPLS (Generalized MPLS). An emerging standard is PCE (Path Computation Engine) by which a server computes a path through the network.

These electronic control plane technologies are adapted for electronic networks. But unlike electronic networks, not only must the physical path of the communication through a DWDM network be determined, but also its wavelength. Furthermore, the nature of the optical signals requires that optical parameters, e.g., the attenuation, chromatic dispersion between the nodes and the like, be considered in the proper selection of an optical path to ensure that signals reach their intended destination in proper condition. Otherwise, the optical signals must be regenerated at one or more intermediate nodes between source and destination.

Control planes of proposed optical networks either do not appear to have considered the problems and requirements of routing a communication through an optical network without regeneration, or the nodes of the proposed network are packed with optical parametric information so that each node can properly calculate the routing connections. In such cases, the processors at the nodes often require so much computing power and time to process the complex routing algorithms that routing operations are slowed. The result is that either the problem of optical networks is ignored completely or the proposed solution adversely affects the operations of the network.

The present invention provides for optical control planes which while highly suitable for routing a communication through an optical network, are easily adaptable with electronic control planes.

DETAILED DESCRIPTION OF THE INVENTION

Figure 1:
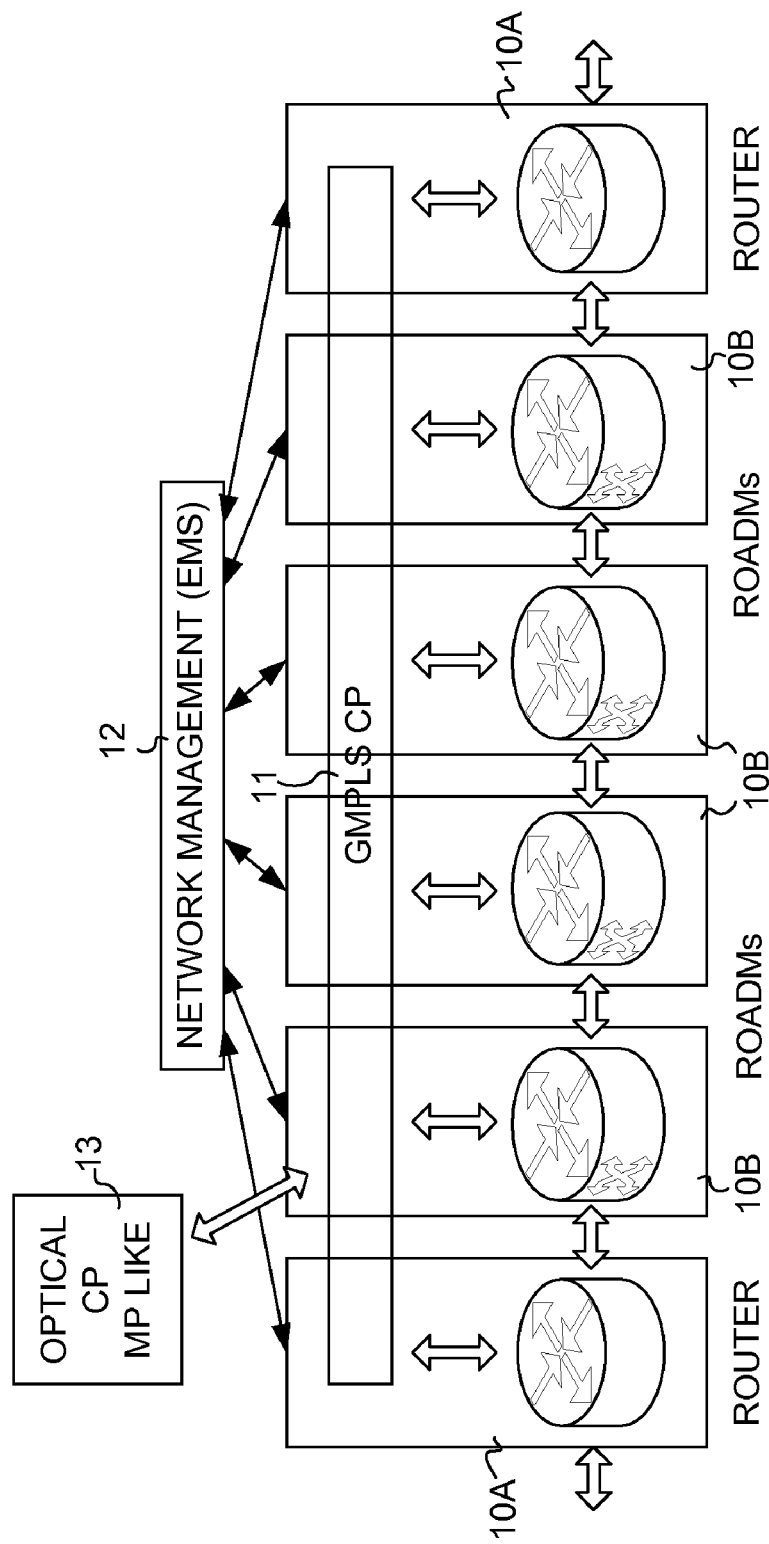
FIG. 1 shows a representative optical network in which an optical control plane is external to the nodes of the optical network according to one embodiment of the present invention.

A representative DWDM network is illustrated in FIG. 1. The nodes 10 of the optical network are represented by router nodes 10A and add/drop nodes 10B in the form of ROADMs (Reconfigurable Optical Add/Drop Multiplexers). Typically OADMs (Optical Add/Drop Multiplexers) imply that optical signals of one or more fixed wavelengths are dropped and/or added at the node and that ROADMs imply that the added and/or dropped wavelengths at the node can be changed or reconfigured. The ROADMs are shown in the drawings for purposes of generality and should not be considered a limitation.

In an optical network routers handle the main switching functions of the optical network at the nodes 10A. The add/drop nodes 10B provide entry (add) and exit (drop) points to the network. Hence source and destination nodes of a message in the FIG. 1 network are the add/drop nodes 10B. While only four of add/drop nodes 10B are shown, these are merely representative of the nodes 10B in the network. Arrows show that router nodes 10A are connected to more nodes 10B (and other router nodes 10A). The network connections between nodes 10A and 10B can be quite complex and an electronic network control plane 11 here operating under GMPLS handles the routing of a message between some source and destination nodes 10B. Over the electronic network control plane 11 is a network management system 12 which handles the higher supervisory and control functions of the network.

As described earlier, the electronic control plane 11 determines the path and routes messages through the network, but it does not take into account any optical impairments along the routing path. The electronic control plane 11 associated with each network node 10 has the standard information of basic fiber connectivity between nodes for routing a communication. The electronic control plane 11 does not have the detailed information on the optical performance of the links between the nodes, i.e., the optical impairments introduced by components along a potential path, such as noise by an amplifier or insertion loss through a switching device. Furthermore, the electronic control plane 11 does not know the detailed configuration of the nodes themselves. For example, the electronic control plane 11, while in intimate communication with a node, does not know whether it has a ROADM (Reconfigurable Optical Add/Drop Multiplexer) or a simpler OADM, or whether the node has a pre-amplifier and a booster amplifier, or only one amplifier.

In accordance with the present invention, an optical control plane (OCP) which is distinct from the electronic control plane 11 determines the optical feasibility of a routed path. The distinct OCP can be installed and upgraded over the electronic control plane 11 without interrupting existing networks. This "modularization" approach has the benefits of easy implementation and standardization. The OCP receives information of the optical elements in the network so that the optical feasibility of a path from its source node to its destination node can be determined from the optical parameters of the signal along the path. If the optical feasibility is determined to be negative, the optical impairments of the path exceeds predetermined thresholds, the OCP generates an error message and requests the electronic control plane to find a new route. This ensures that the paths routed through the network are optically feasible.

In the FIG. 1 network, the OCP runs on an external server 13 which communicates with the network control plane 11, according to one embodiment of the present invention. The OCP server 13 which is removed from the electronic control plane 11, checks the optical feasibility of a path routed by the electronic network plane 11. The server 13 can operate with a GUI (Graphical User Interface) for ease of operation and with relatively unlimited processing power and memory to determine the optical feasibility of path routes. Server can also be upgraded without affecting network operations.

Figure 4:
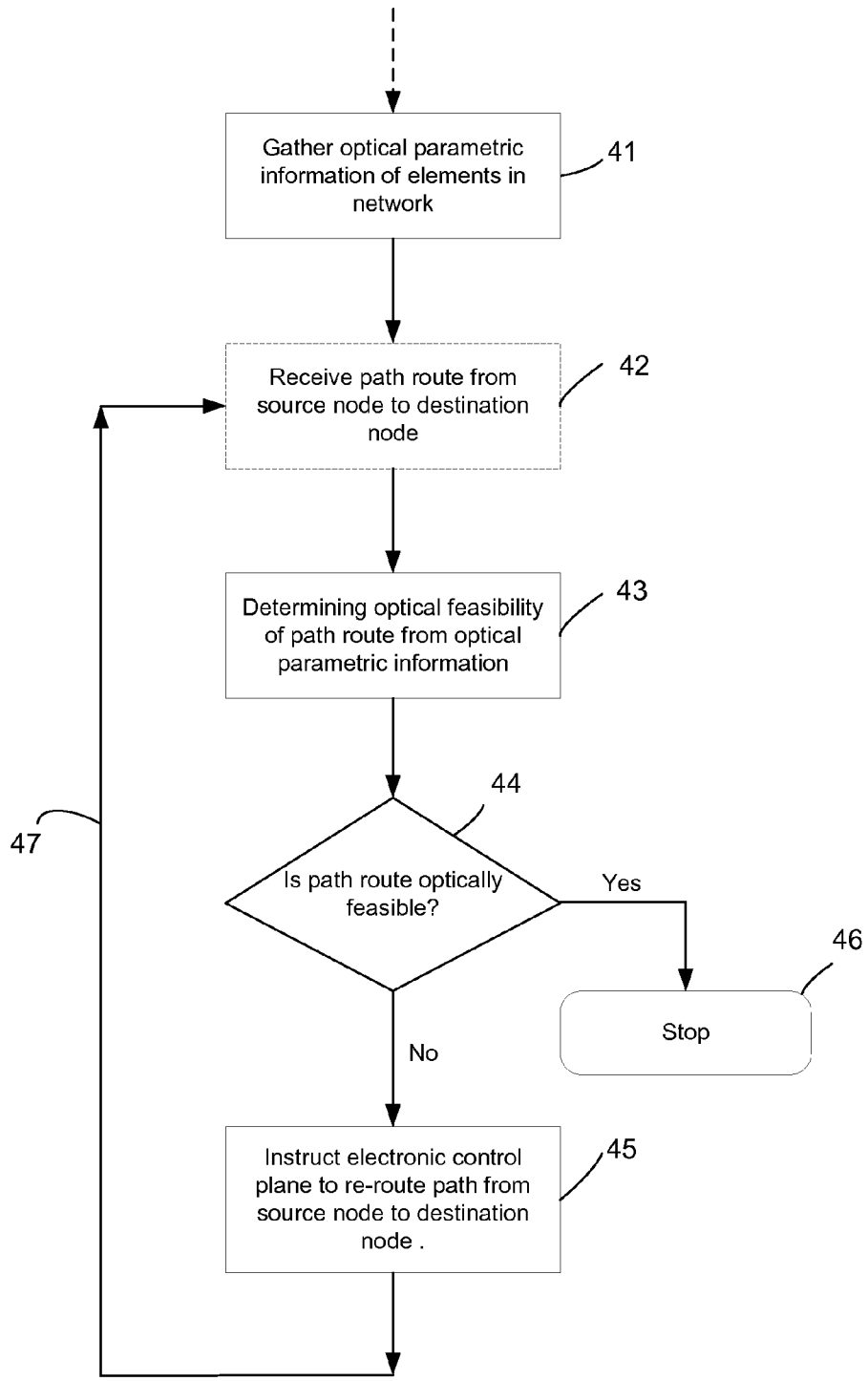
FIG. 4 is a flow chart of the more general operations of the different optical network arrangements of the present invention.

FIG. 4 is a flow chart of the operations of the OCP. It is assumed that the OCP is operating in some manner so that the first step 41 is shown as part of an ongoing process. In step 41 the OCP gathers optical parametric information on the elements of the network, i.e., that OCP obtains information on the network elements which affect optical signals passing through the network. The term, "gathers," is used to include actions in which the OCP is passive and receives network element optical information sent to the OCP. In step 42 the OCP receives a path routed by the electronic control plane 11 for a communication from its source node to its destination node. Step 43 checks the optical feasibility of the path from the optical parametric information. The OCP calculates whether an optical signal along the path route from the source node to the destination node meets predetermined signal criteria from the optical parametric information. Stated differently, is the optical signal sufficiently robust after passing through network elements along the path route or has it been degraded to such an extent that it cannot be recovered at the destination node? Optical parametric information about the network elements include optical noise (how much noise is created in the signal by the elements), optical power (how much signal power is attenuated by the elements), wavelengths (at what wavelengths is the signal), and tilt (how has the signal been tilted after passing the previous nodes and/or elements). All of this information can be used to calculate the optical feasibility of the path routed by the electronic network 11. For example, thresholds can be set for each of these optical parameters for a signal to reach its destination node from its source node and calculations determine whether these thresholds are met or not.

In decision step 44 the path route is checked whether it is optically feasible? If yes, then the process stops at step 46. If not, then step 45 has the OCP to instruct the electronic control plane 11 to re-route the path and the process starts over by loop 47 to step 42.

Figure 2A:
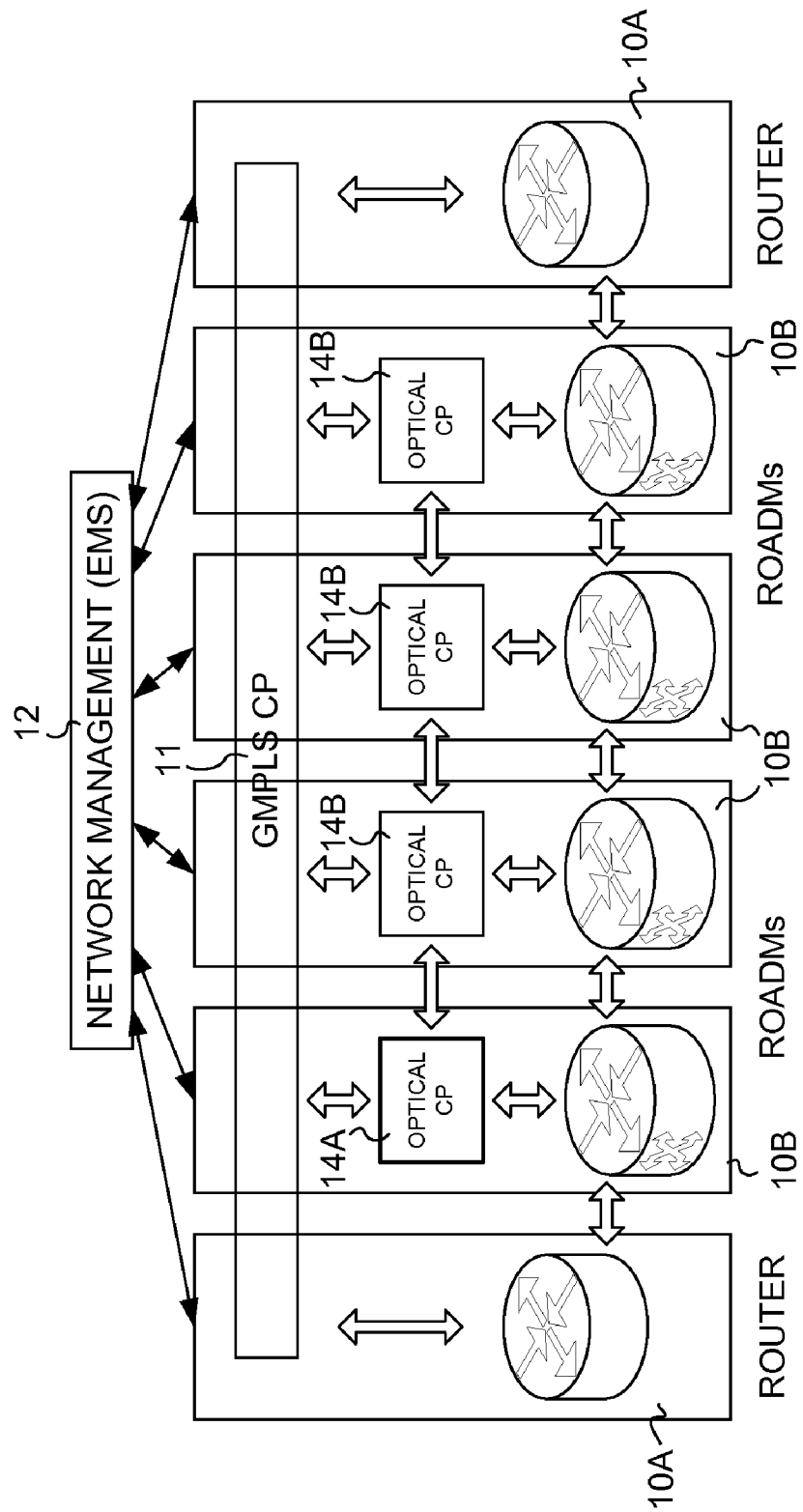
FIG. 2A shows a representative optical network in which the optical control plane is embedded into the nodes of the optical network and one of the OCP nodes checks the optical feasibility of a path route, according to another embodiment of the present invention.

FIG. 2A illustrates another embodiment of the present invention. Here the optical control plane 14 is physically distributed across the nodes 10B of the optical network. It should be noted that the same reference numbers are used to indicate elements which are identical or substantially similar in function or operation as in earlier drawings. All the parts 14 of the distributed OCP gather optical parametric information on the network elements (step 41 in FIG. 4) but in this embodiment, only a part 14A (illustrated by a darkened border) of the OCP receives the path route information from the electronic control plane 11 (step 42), determines the optical feasibility of the path route (step 43, (step 44); and (step 45) optical control plane checks channel feasibility. The other parts 14B of the optical control plane do not. The OCP part 14A is selected according to the path route from the electronic control plane 11 to be either near the source node or the destination node. It should be noted that the OCP is located at the add/drop nodes 10B of the WDM network. In contrast to the nodes 10B, the routers at the nodes 10A regenerate, reshape and retime optical signals so that the functions of the OCP are not required at these switching nodes.

Figure 2B:
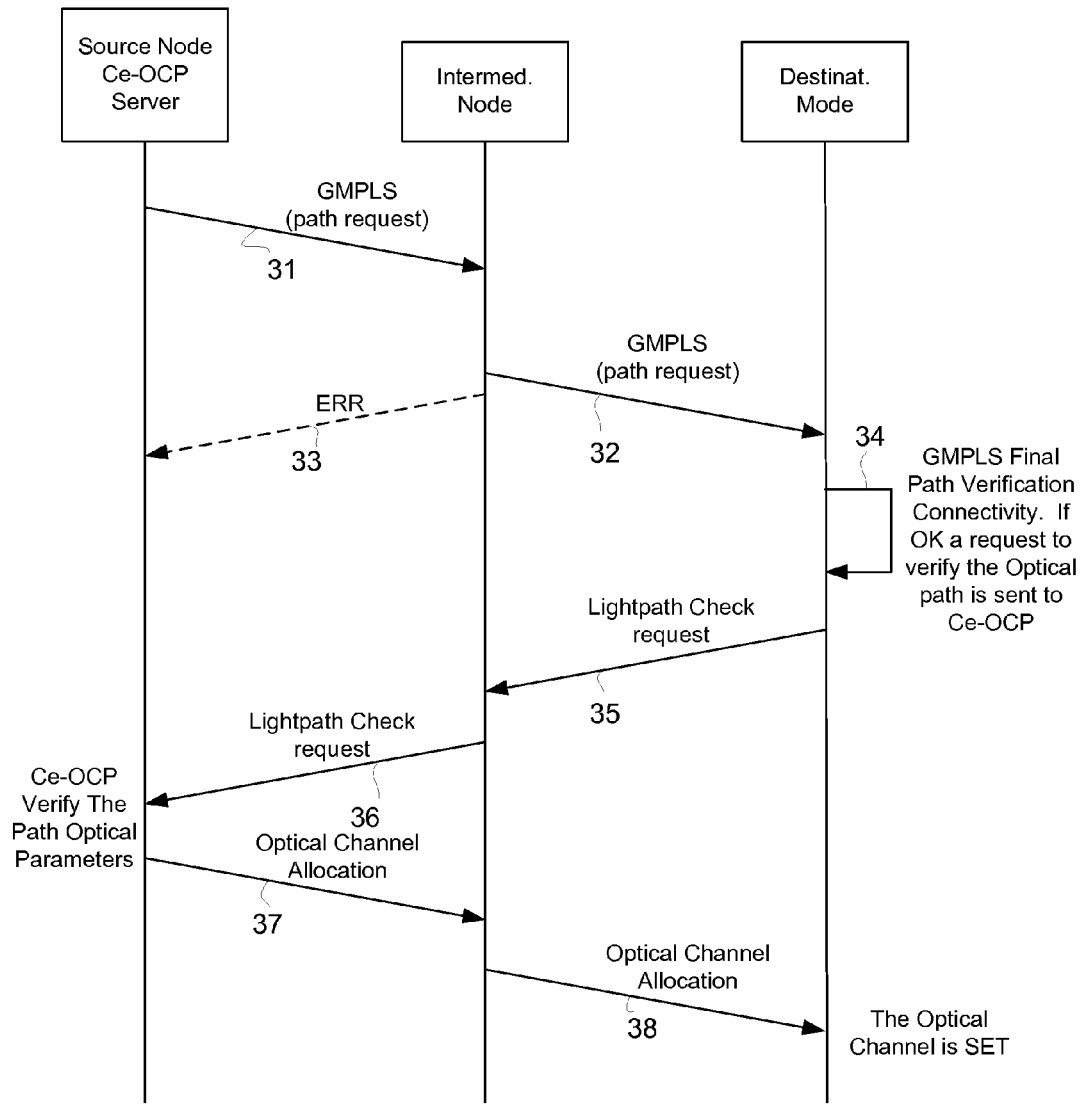
FIG. 2B shows the operation of the nodes of the FIG. 2A network.

FIG. 2B illustrates the operation of the FIG. 2A network in more detail. The source node holds the OCP part 14A described above and sends a GMPLS path request message 31 to the destination node through one or more representative node(s). The representative node sends either a GMPLS error message 33 or relays the path request 32 to the destination node. The destination node, upon verification of the GMPLS path connectivity, sends a request 35 back toward the source node to verify the lightpath. The intermediate node relays the request 36 to the source node which determines the optical feasibility of the path route. If the path route is determined to be feasible, the source node sends a optical channel allocation message 37 and 38 to the destination node.

Figure 2C:
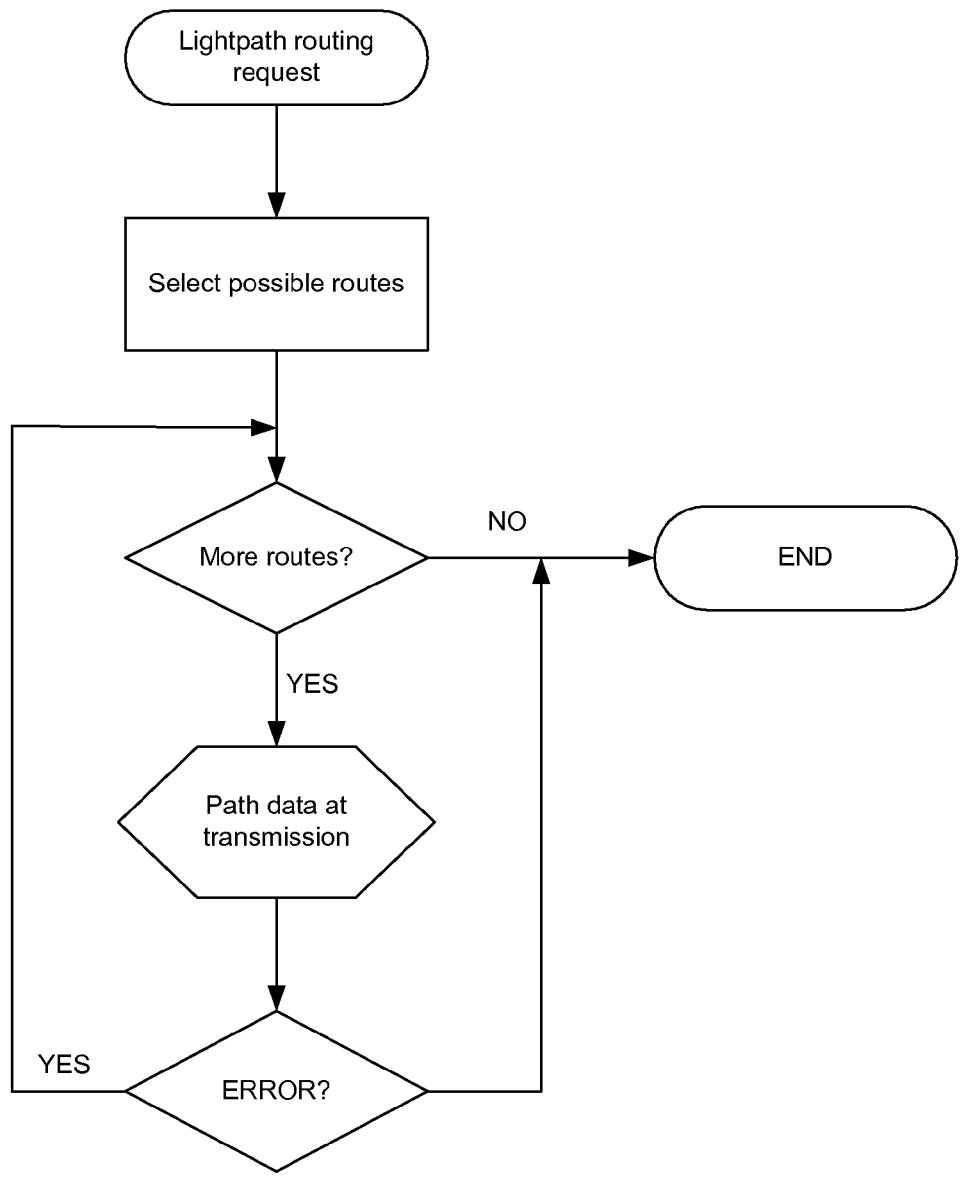
FIG. 2C shows the flow chart of operations of the source node.
Figure 2D:
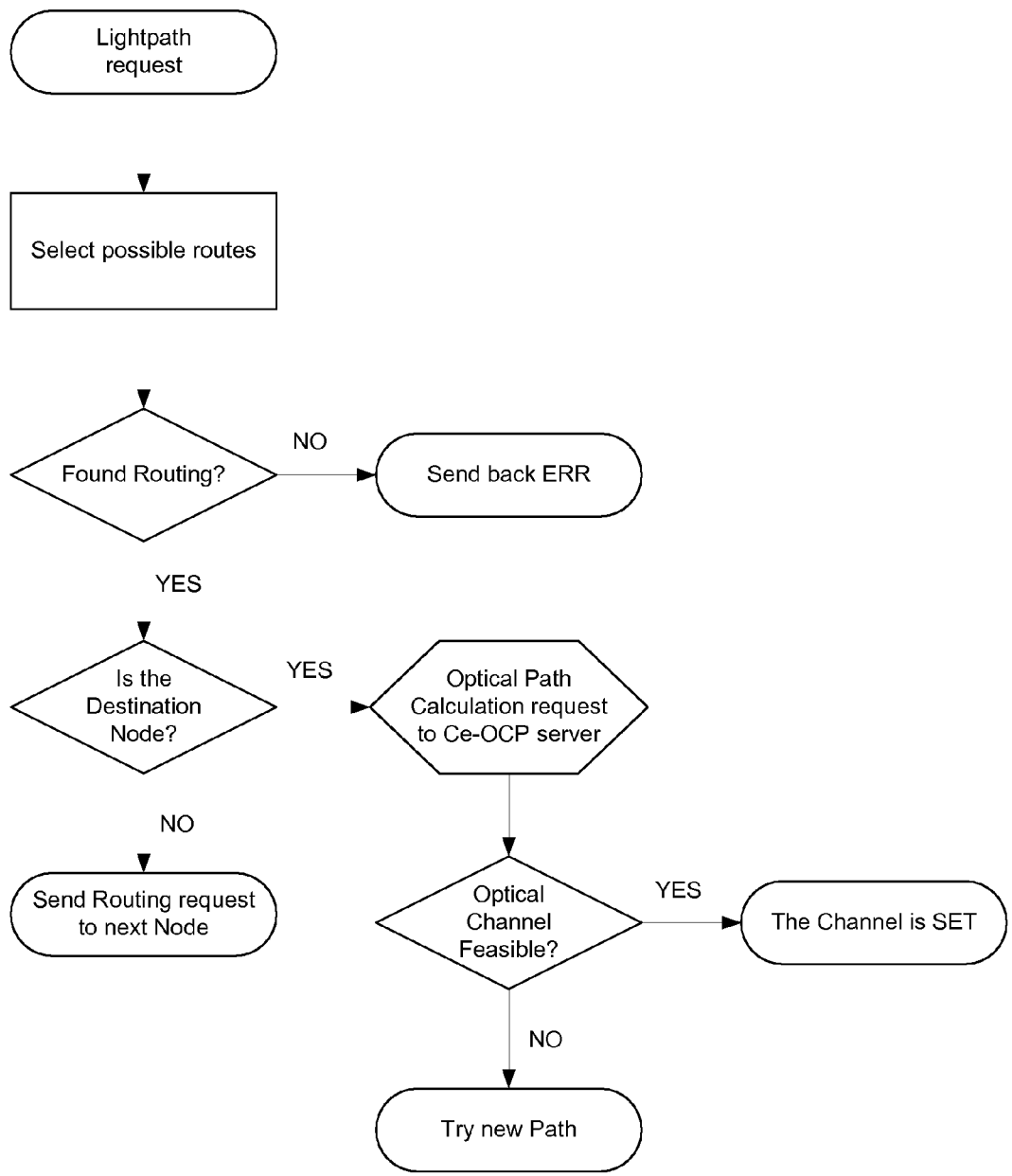
FIG. 2D shows the flow chart of operations of the intermediate and destination nodes.

FIGS. 2C and 2D show flow charts of operations of the source node and intermediate/destination nodes, respectively.

Figure 3A:
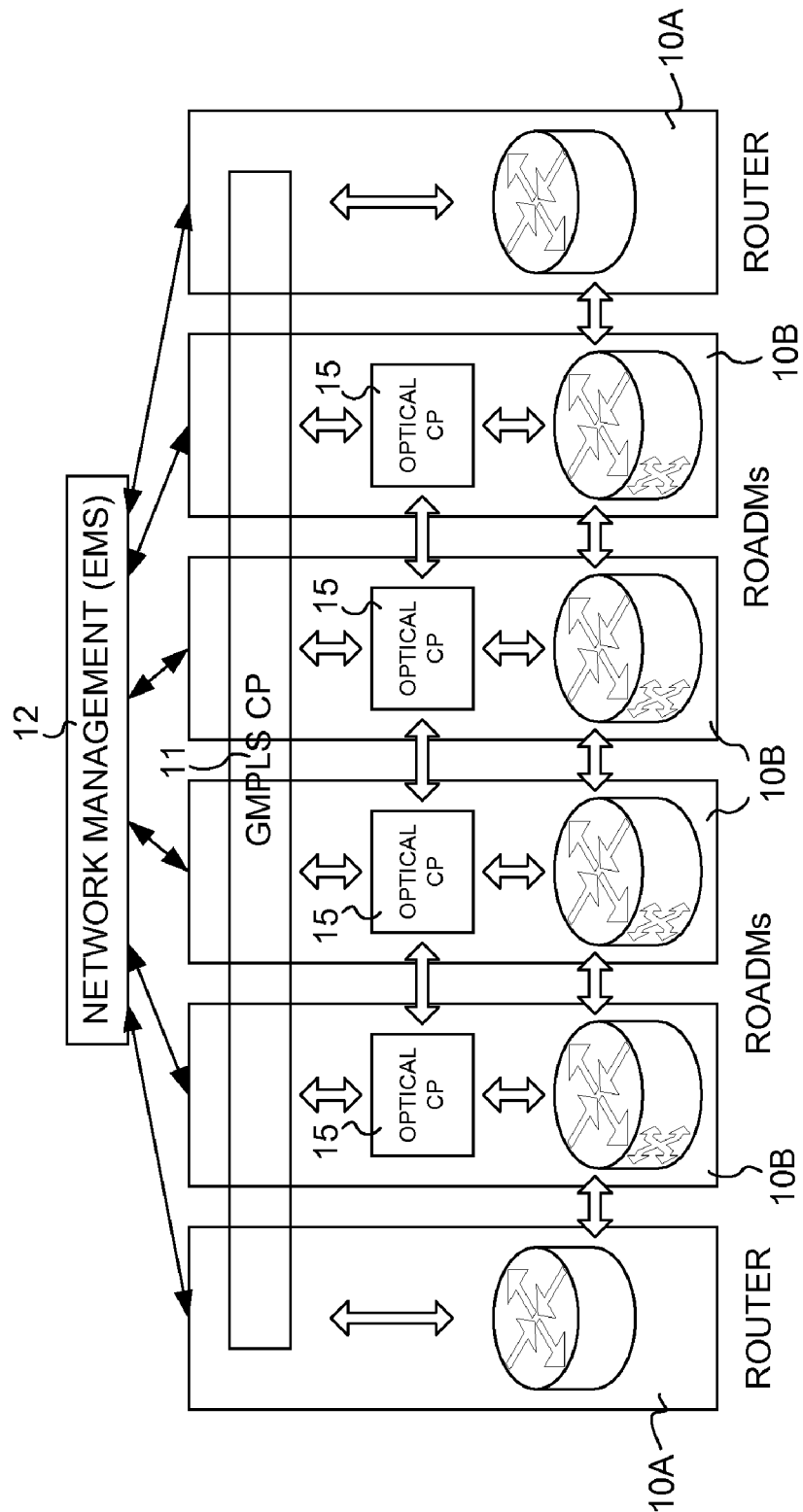
FIG. 3A shows a representative optical network in which the optical control plane is embedded into the nodes of the optical network and all of the nodes participate to check the optical feasibility of a path route, according to still another embodiment of the present invention.

The OCP illustrated in FIG. 3A also follows the operations illustrated in FIG. 4. In the optical network of FIG. 3A the optical control plane is also distributed in parts 15 across the nodes 10B of the network. In this embodiment of the present invention, however, each part 15 of the OCP gathers optical parametric information on a limited basis and the distributed OCP participates in the determination of the optical feasibility of the optical path between the source and destination nodes 10B. Each OCP part 15 gathers optical parametric information about the optical elements of the node in which the OCP part 15 is embedded and uses this information to determine the optical feasibility of a path. The amount of information gathered at each node is relatively little and can be obtained from information of the manufacturer of the elements or from previous behavior of the elements.

For a path routed by the electronic control plane, the nodes along the path through the embedded OCP part 15 sequentially receives a probe message from a previous node along the path to determine the optical feasibility of the path up to the current node. If the OCP part 15 at the node determines optical feasibility is negative, the OCP part 15 instructs the electronic control plane to re-route the path and the process is restarted from the source node. This allows for a quick elimination of unfeasible path routes. Otherwise, the probe message continues until the destination node is reached and the path route is confirmed.

The probe message could contain an explicit route or multiple probe messages could be flooded through the network in multiple directions by the source and/or by the intermediate nodes to determine path routes concurrently. To avoid any synchronicity in the sending of multiple probes by different source nodes, the transmission of the probes is timed by dynamic jitter which can easily be configured as a parameter of a network protocol. For multiple probe messages, the intermediate nodes manage concurrently received probes. For example, if two probes reach an intermediate probe, the first received probe message locks or blocks the "optical" resources of the node from the second received probe, and the second one fails because of the missing resources indicate a lack of optical feasibility. If the first probe fails, the resources in the intermediate node are unlocked and a notification message informs the second probe, or its source node, that resources are now available for the second probe message to try again, i.e., to determine its optical feasibility through the intermediate node. This mechanism applies to N probes reaching the intermediate node.

Figure 3B:
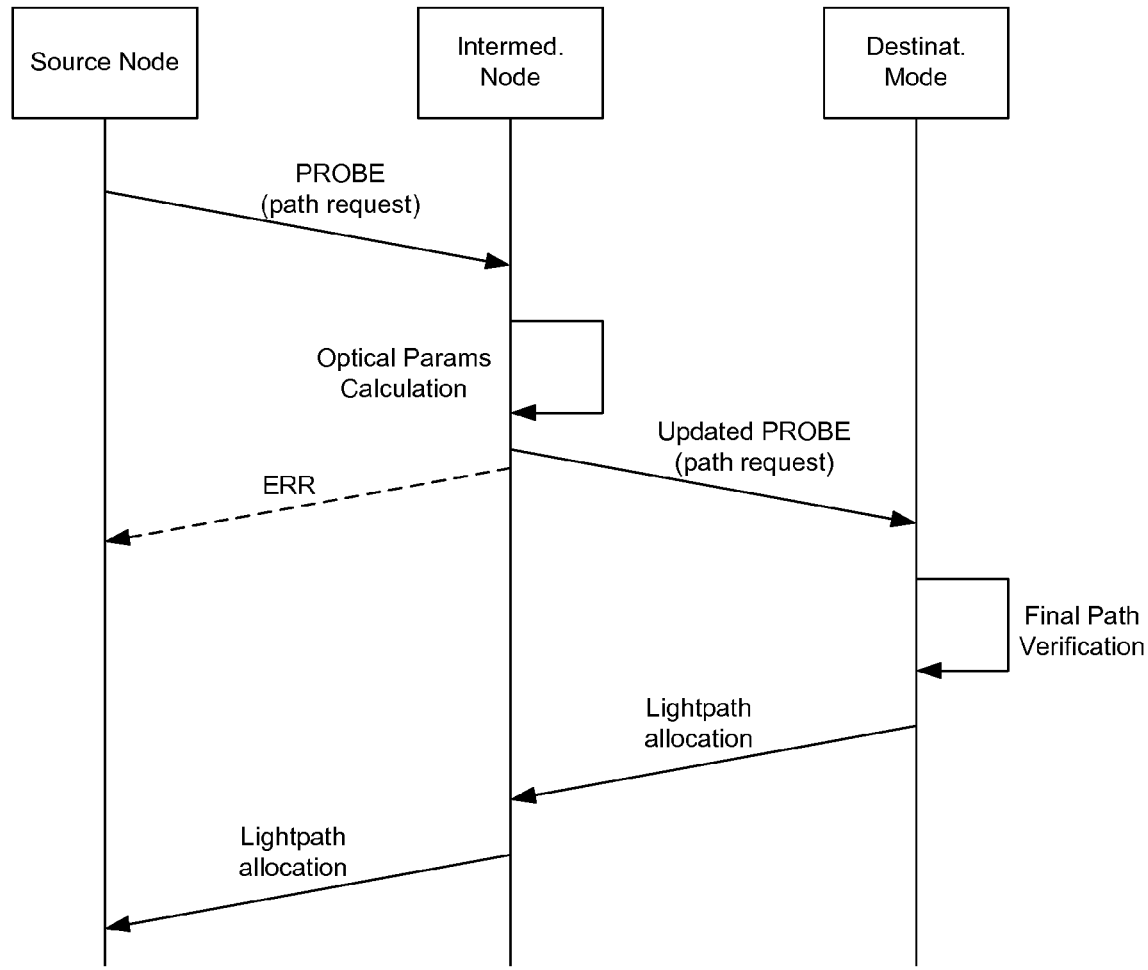
FIG. 3B shows the operation of the nodes of the FIG. 3A network.

FIG. 3B shows a simplified process for the source node, a single representative intermediate node and the destination node. Again it should be noted that the nodes intermediate the source and destination nodes of a communication can terminate one path route and engage the re-routing process. This allows early discards of unfruitful paths and speeds up the determination of an acceptable path route.

Figure 3C:
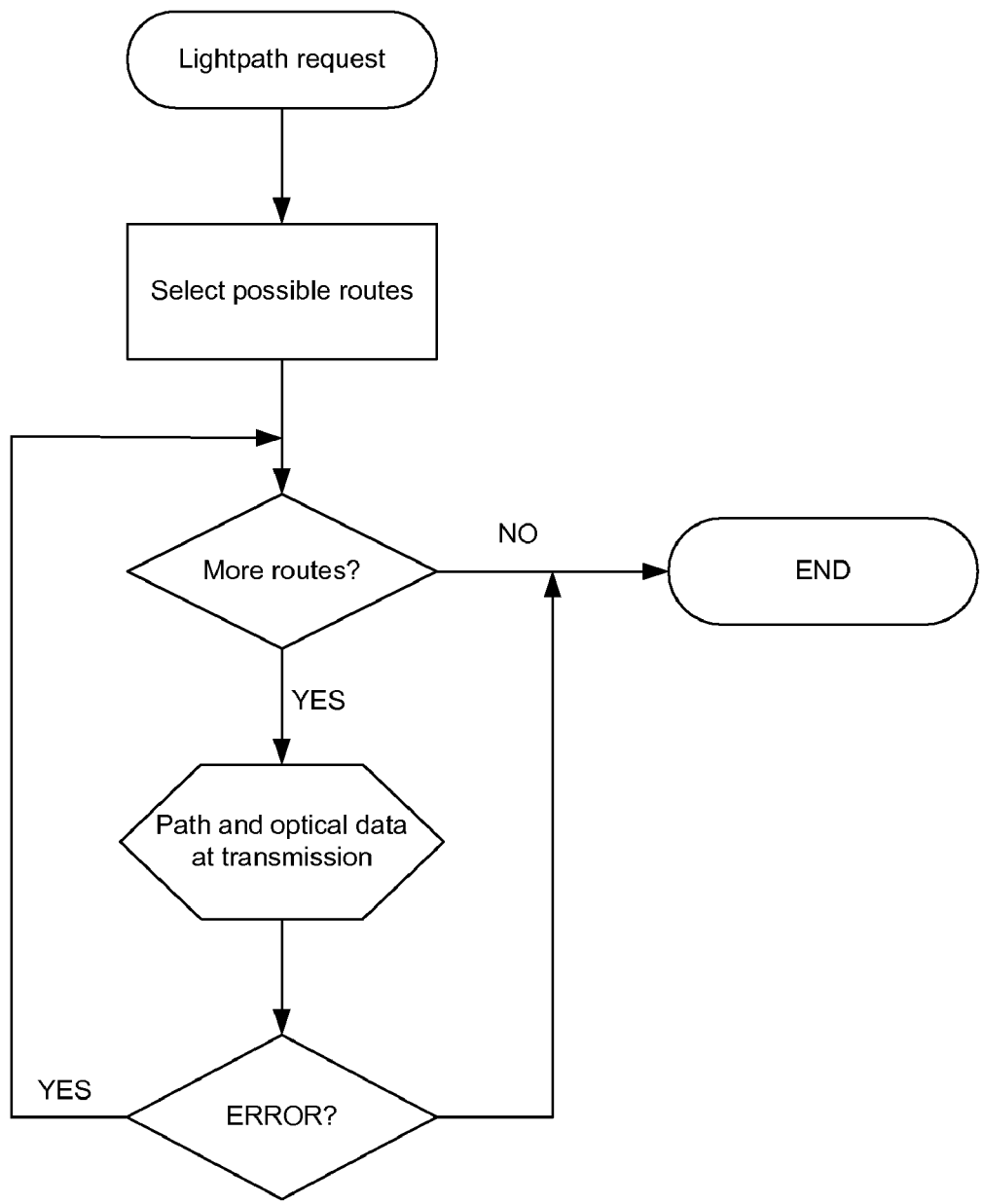
FIG. 3C shows the flow chart of operations of the source node.
Figure 3D:
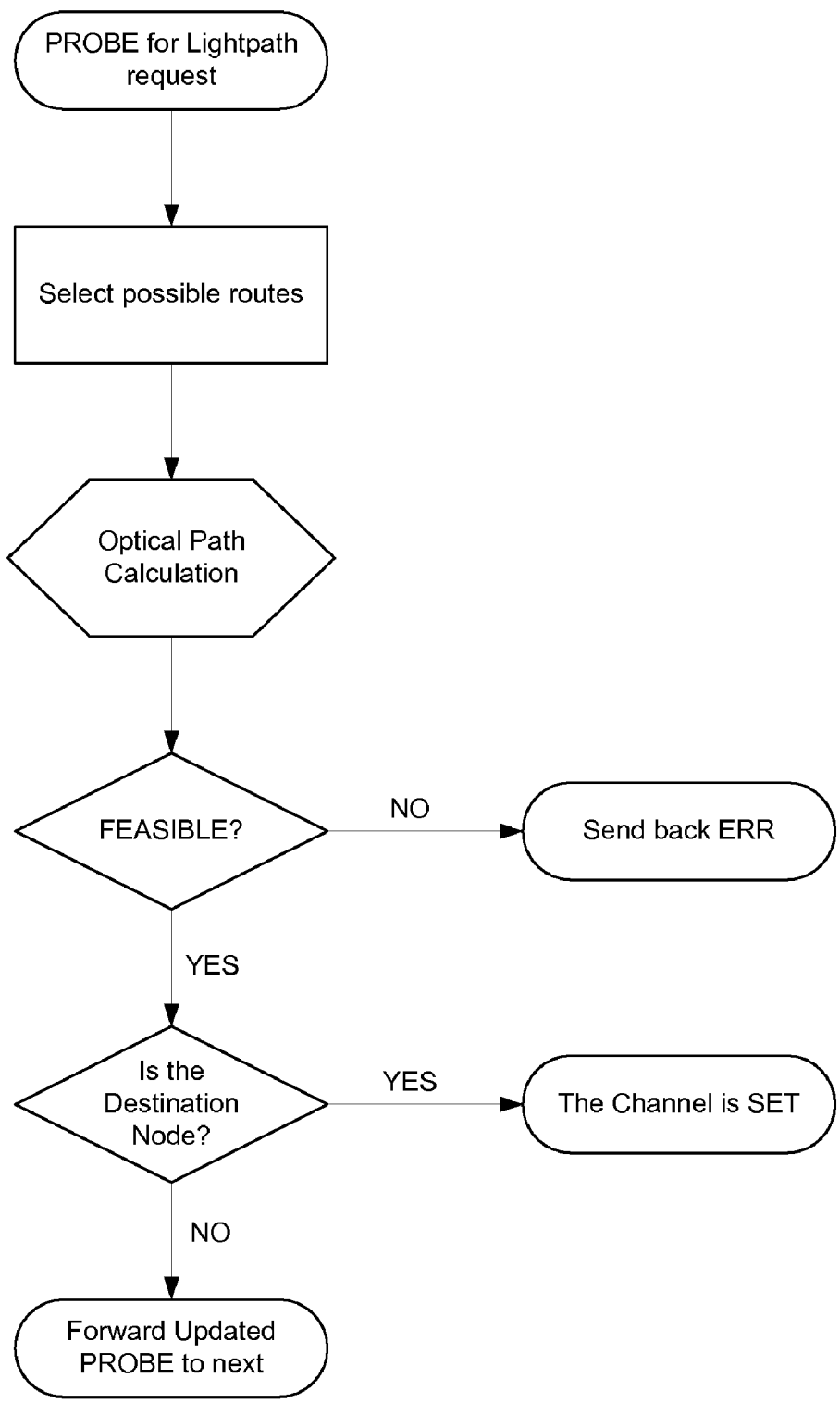
FIG. 3D shows the flow chart of operations of the intermediate and destination nodes.

FIGS. 3C and 3D show flow charts of operations of the source node and intermediate/destination nodes, respectively.

Hence a probe message tracks the optical impairments along the path route. In one particular embodiment, each probe message has two kinds of optical parametric information, "cumulative" and "recoverable." Cumulative parametric information refer to signal parameters, such as optical signal-to-noise ratio (OSNR), which can only vary monotonically as the signal proceeds along the path route and cannot be recovered upon reaching a certain limit. Recoverable parametric information refer to signal parameters, such as optical power, which can vary with the appropriate optical element (e.g., an optical amplifier) in the signal path. The probe messages start with an allowed optical budget for each optical parameter for the path based on the source transmitter, and the budget is decreased by every node as it is passed. The path is unfruitful and discarded if the budgets for both cumulative and recoverable optical parametric information falls below an amount necessary for the signal at the node to reach all its neighbors, or if just the budget for one of cumulative optical parametric information falls below a threshold T. The threshold T depends upon the remaining hops from the present node to the destination node and is, of course, greater than the threshold to reach the next hop in the path and should be at least as required by the hops remaining to reach the destination node. This can be calculated from historical data.

Figure 5:
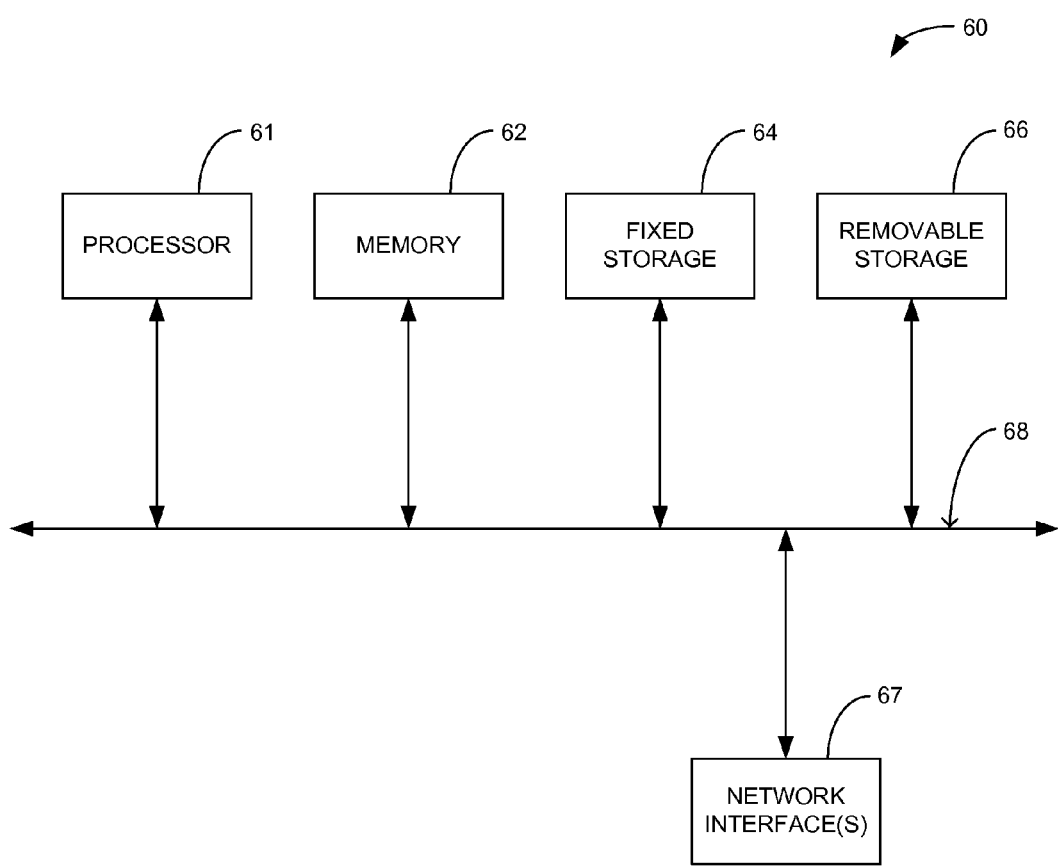
FIG. 5 represents an organization of a computing element which may act as an OCP server or OCP part embedded in a network node, according to another embodiment of the present invention.

FIG. 5 illustrates a block diagram of an example computing element 60 that may be used for the OCP, such as the server 13 in FIG. 1, or as an OCP part distributed over the nodes in FIGS. 2 and 3, according to one embodiment of the present invention. The computing element 60 includes a memory subsystem 62 which can store and retrieve software programs incorporating computer software code that implements aspects of the invention, data for use with the invention and the like, and a central processor subsystem 61 which, among other functions, processes the instructions and data of the computer code. Example computer readable storage media for the memory 62 include semiconductor system memory preferably, CD-ROM, floppy disk, tape, flash memory, and hard drive. The element 60 further includes subsystems, such as fixed storage 64 (e.g., hard drive), removable storage 46 (e.g., CD-ROM drive), and one or more network interfaces 67, all connected by a system bus 68. The network interface 67, for example, might provide the pathway through which OCP data and instructions, such as path messages previously described, are sent and received. Additional or fewer subsystems may be used. For example, element 60 may include more than one processor 61 (i.e., a multi-processor system), or a cache memory.

Therefore, while the description above provides a full and complete disclosure of the preferred embodiments of the present invention, various modifications, alternate constructions, and equivalents will be obvious to those with skill in the art. Thus, the scope of the present invention is limited solely by the metes and bounds of the appended claims.

The invention claimed is:

1. A method comprising:
   in a dense wavelength division multiplexed (DWDM) network having a plurality of nodes and an electrical control plane that is configured to communicate with the plurality of nodes to handle routing of messages between the plurality of nodes and an optical control plane, designating an optical path route from a source node to a destination node by the electrical control plane;
   receiving the path route at the optical control plane;
   gathering optical parametric information of elements in the path route by the optical control plane;
   determining a number of optical impairments along the optical path route using the optical parametric information; and
   determining optical feasibility of the path route from the source node to the destination node by the optical control plane based on the number of optical impairments along the optical path route.

2. The method of claim 1, further comprising sending an optical channel allocation message by the optical control plane from the source node to the destination node if the path route is determined to be feasible.

3. The method of claim 1, further comprising centralizing the optical control plane in a server distinct from the electrical control plane and wherein receiving the path route, gathering optical parametric information and determining optical feasibility are performed at one or more of the plurality of nodes in the network.

4. The method of claim 3, wherein determining comprises determining optical feasibility at each node along the path route until the optical control plane determines that the path route is not optically feasible.

5. The method of claim 4, further comprising receiving a plurality of path routes from the electrical control plane at the optical control plane, and determining optical feasibility at the optical control plane of intermediate nodes in each of the plurality of path routes.

6. The method of claim 5, wherein the path route is one of a plurality of path routes, and further comprising determining optical feasibility at the optical control plane for the path route with a first probe message of a plurality of probe messages concurrently received by an intermediate node that is shared among multiple sequential path routes, and if the path route with the first probe message is not optically feasible, determining the optical feasibility for other path routes in the plurality of path routes with others of the plurality of probe messages that are received by the intermediate node.

7. The method of claim 6, wherein when the optical control plane determines that the path route with the first probe message is optically feasible blocking the optical resources of the intermediate node to prevent determination of optical feasibility for path routes with others of the plurality of probe messages that are received by the intermediate node.

8. The method of claim 4, further comprising instructing the electrical control plane by the optical control plane to re-route the path route if the optical plane determines that the path route is not optically feasible.

9. The method of claim 3, wherein receiving, gathering and determining are performed at add/drop nodes of the network.

10. The method of claim 1, wherein gathering comprises gathering optical parametric information including optical power, optical noise, wavelength and optical tilt.

11. The method of claim 1, wherein determining optical feasibility by the optical control plane comprises comparing the gathered optical parametric information with predetermined optical parametric thresholds.

12. The method of claim 1, further comprising generating an error message by the optical control plane if the path route is determined not to be feasible, and requesting by the optical control plane to the electrical control plane to designate a new path route from the source node to the destination node.

13. The method of claim 1, wherein gathering comprises gathering optical parametric information passively by receiving optical parametric information at the optical control plane.

14. The method of claim 1, further comprising determining whether an optical signal along the path route meets predetermined signal criteria from the optical parametric information.

15. The method of claim 14, wherein determining comprises determining whether the optical signal is sufficiently robust after passing through network elements along the path route.

16. The method of claim 15, wherein determining whether the optical signal is sufficiently robust comprises computing information about the optical signal as it passes through the network elements including optical noise, optical power, wavelength of the optical signal, and tilt.

17. The method of claim 16, further comprising setting thresholds for the information used for determining whether the optical signal is sufficiently robust.

18. The method of claim 1, wherein determining comprises sequentially receiving a probe message at the optical control plane from a previous node along the path route.

19. The method of claim 18, wherein receiving comprises transmitting multiple probe messages and timing the transmission of probe messages using a dynamic jitter configured as a parameter of a network protocol.

20. The method of claim 18, wherein receiving comprises receiving the probe message having an optical budget for optical parameters associated with the path route, the optical budget being decreased as the probe message passes through each node along the path route, and discarding the path route when the optical budget for cumulative and recoverable optical parametric information falls below a threshold or falls below an amount necessary for an optical signal at a node of the path route to reach neighboring nodes of the path route.

21. The method of claim 18, wherein receiving comprises receiving the probe message at the optical control plane sequentially from the previous node along the path route until the optical path is not feasible.

22. The method of claim 21, wherein transmitting comprises transmitting multiple probe messages that track optical impairments along the path route.

23. The method of claim 22, wherein transmitting comprises transmitting multiple probe messages that track optical impairments with cumulative parametric information.

24. The method of claim 22, wherein transmitting comprises transmitting multiple probe messages that track optical impairments with recoverable parametric information.

25. An apparatus comprising:
a memory that stores an optical path route designated by an electrical control plane from a source node to a destination node in a dense wavelength division multiplexed (DWDM) network, the optical path route being used for optical communication between the source node and destination node; and
at least one processor configured to:
gather optical parametric information of elements in the path route;
determine a number of optical impairments along the optical path route using the optical parametric information; and
determine optical feasibility of the optical path route from the source node to the destination node based on the number of optical impairments along the optical path route.

26. The apparatus of claim 25, wherein the processor is configured to send an optical allocation message from the source node to the destination node if the path route is determined to be feasible.

27. The apparatus of claim 26, wherein the processor is configured to gather and determine optical parametric information and determine optical feasibility at one or more of a plurality nodes between the source node and the destination node.

28. The apparatus of claim 26, wherein the processor is configured to determine optical feasibility at each node along the path route until the path route is determine to be not optically feasible.

29. The apparatus of claim 28, wherein the processor is configured to determine the optical feasibility at intermediate nodes in each of a plurality of path routes.

30. The apparatus of claim 29, wherein the path route is one of a plurality of path routes, and wherein the processor is configured to determine the optical feasibility at the optical control plane for the path route with a first probe message of a plurality of probe messages concurrently received by an intermediate node that is shared among multiple sequential path routes, and if the path route with the first probe message is not optically feasible, the processor determines the optical feasibility for other path routes in the plurality of path routes with others of the plurality of probe messages that are received by the intermediate node.

31. The apparatus of claim 30, wherein when the processor determines that the path route with the first probe message is optically feasible, the processor is configured to block the optical resources of the intermediate node to prevent determination of optical feasibility for path routes with others of the plurality of probe messages that are received by the intermediate node.

32. The apparatus of claim 25, wherein said optical parametric information comprises optical power, optical noise, wavelength and optical tilt.

33. The apparatus of claim 25, wherein the processor is configured to determine optical feasibility by comparing the gathered optical parametric information with predetermined optical parametric thresholds.

34. The apparatus of claim 25, wherein the processor is further configured to generate an error message if the path route is determined not to be feasible and to request the electrical control plane to designate a new path from the source node to the destination node.

* * * * *